United States Patent [19]

Sun

[11] Patent Number: 5,520,822
[45] Date of Patent: May 28, 1996

[54] APPARATUS AND METHOD OF HYPERBARIC FILTRATION

[75] Inventor: Fuhua Sun, Lexington, Ky.

[73] Assignee: University of Kentucky Research Foundation, Lexington, Ky.

[21] Appl. No.: 111,363

[22] Filed: Aug. 24, 1993

[51] Int. Cl.$^6$ .............................. B01D 17/06; B01D 29/72
[52] U.S. Cl. ......................... 210/748; 210/243; 210/388; 210/406; 210/771
[58] Field of Search ........................... 210/748, 770, 210/388, 406, 771, 243; 204/180.8, 152

[56] References Cited

U.S. PATENT DOCUMENTS

| | | |
|---|---|---|
| 751,810 | 2/1904 | Rice . |
| 2,663,427 | 12/1953 | Riedel . |
| 2,714,349 | 8/1955 | Johnston . |
| 2,740,756 | 4/1956 | Thomas . |
| 2,771,194 | 11/1956 | Baxter et al. . |
| 3,975,274 | 8/1976 | Nommensen ............................ 210/412 |
| 4,003,819 | 1/1977 | Kunkle et al. . |
| 4,116,831 | 9/1978 | Keat . |
| 4,207,158 | 6/1980 | Freeman ................................... 210/406 |
| 4,244,804 | 1/1981 | Moeglich . |
| 4,312,729 | 1/1982 | Wills . |
| 4,367,132 | 1/1983 | Bell et al. . |
| 4,552,669 | 11/1985 | Sekellick . |
| 4,569,762 | 2/1986 | Gaudfrin . |
| 4,655,932 | 4/1987 | Roslonski . |
| 4,826,607 | 5/1989 | Pearce . |
| 5,085,997 | 2/1992 | Muller . |
| 5,141,714 | 8/1992 | Obuchi et al. ...................... 55/DIG. 30 |
| 5,211,814 | 5/1993 | Jaakkolo et al. ......................... 162/301 |
| 5,213,687 | 5/1993 | Ginn et al. ............................. 210/333.1 |
| 5,346,533 | 9/1994 | Jelich et al. ............................... 55/270 |

FOREIGN PATENT DOCUMENTS

| | | |
|---|---|---|
| 221920 | 5/1985 | Germany . |
| 3729250 | 1/1989 | Germany ................................ 210/771 |

OTHER PUBLICATIONS

CA 120:327183.

*Primary Examiner*—Virginia Manoharan
*Attorney, Agent, or Firm*—King and Schickli

[57] ABSTRACT

An apparatus for hyperbaric filtration includes a sealable filtering vessel including an internal filtering cavity. A porous filtering plate is mounted in the vessel. The filtering plate divides the cavity into a first chamber wherein the filter cake is held by the filtering plate and a second chamber. A pressurized fluid source is connected by a delivery conduit to the filtering vessel so as to allow the delivery of pressurized fluid to the first chamber. An exhaust conduit is connected to the filtering vessel in communication with the second chamber. A rotary flow control valve in the exhaust conduit is connected to a drive motor so that fluid pressure may be released in a pulsating manner. This serves to vibrate the filter cake and filtering plate freeing moisture for removal with the passage of the pulsating pressurized fluid from the vessel. A circuit is also provided for supplying an electric current to the filter cake during filtering so as to further improve filtering efficiency. A method of hyperbaric filtration is also disclosed.

20 Claims, 1 Drawing Sheet

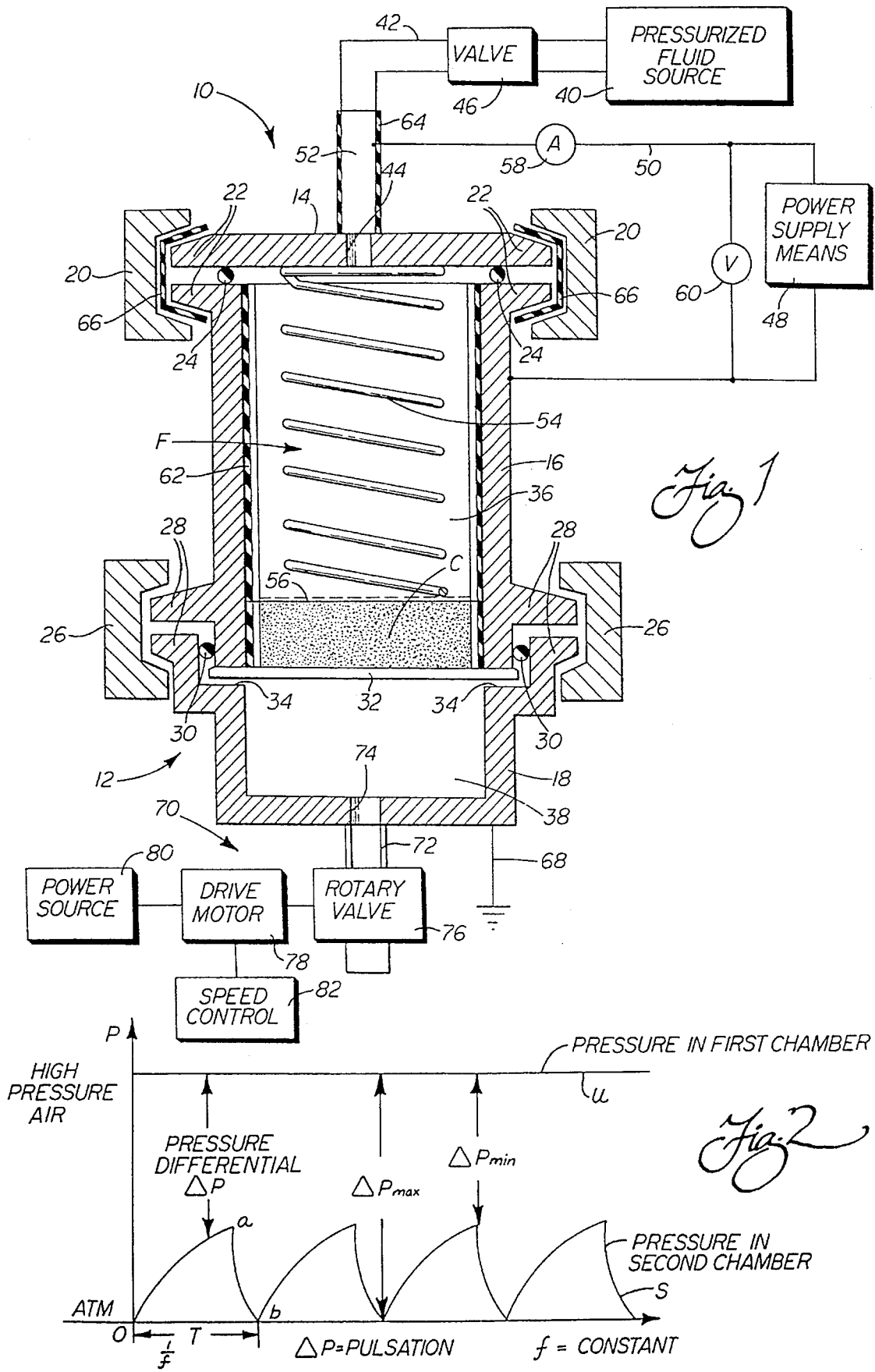

APPARATUS AND METHOD OF HYPERBARIC FILTRATION

TECHNICAL FIELD

The present invention relates generally to the materials processing field and more particularly, to an apparatus and method for pressure or hyperbaric filtration.

BACKGROUND OF THE INVENTION

Filtration is a commonly utilized technology to separate liquids and solids in a number of fields including mineral processing, coal slurry dewatering, as well as in the chemical, food, paper-making and environment protection industries. Liquid filters are of two classes: cake filters and clarifying filters. The present invention relates to filters from the former class that are typically utilized to separate slurries carrying relatively large amounts of solids, typically at least 1%, to be recovered. These solids build up on the filter medium as a visible, removal cake which normally is discharged as a moist mass. There are three types of cake filters. Depending upon the driving force producing the separation of the liquid/solids, there are centrifugal filters, vacuum filters or pressure/hyperbaric filters. The present invention relates to this latter type also classified as batch operating or intermittent filters.

During hyperbaric filtering, very fine particles reduce the size of the capillaries in the filter cake and often close down and partially block the pores in the filtering medium. This serves to increase the threshold pressure which the dewatering or filtering equipment has to exceed to achieve the necessary fluid flow to provide the desired final cake moisture.

Up until recently, hyperbaric filtration theory has focused solely upon the pressure as the driving force of liquid/solid separation. Specifically, an area of high pressure is maintained on one side of the filter cake held on the filtering medium and an area of low pressure is maintained on the other side of the filtering medium. The greater the pressure differential, the greater the flow of fluid and, hence, the separation efficiency.

It has now been discovered that by cyclically deforming the filter cake while under compression, drying of the filter cake is improved. Such a procedure is disclosed in, for example, U.S. Pat. No. 4,826,607 to Pearce. In Pearce a vacuum is applied to a drainage pipe beneath the filter cake held on the filtering medium. This serves to draw moisture from the filter cake. Simultaneously, an oscillating flow of fluid is directed into a separate chamber against an impermeable, flexible membrane that engages the permeable flexible filtering medium. The oscillating flow of fluid causes the membrane and the filtering medium as well as the filter cake held thereon to bend. This bending serves to form capillaries in the filter cake and maintain the pores in the filtering medium open so as to allow improved fluid flow through the filter and, therefore, moisture removal.

In ultra fine particle-liquid suspensions, it has also been found difficult to reduce the moisture content below a certain level by only mechanical means. This is because of the large specific surface area of such suspensions and the electrical charge carried by many of the particles. In order to improve the efficiency of separation of such suspensions it is known to apply a voltage across the filter cake. Such a procedure is shown in, for example, U.S. Pat. No. 4,003,819 to Kunkle et al. Advantageously, the voltage causes the liquid entrained in the filter cake to migrate electroosmotically with the fluid being drawn from the filter cake through the filtering medium.

While the prior art approaches such as disclosed in Pearse and the Kunkle et al patents are effective in increasing the efficiency and effectiveness of liquid/solid separations through filtration, further improvements in overall filtering efficiency may still be achieved.

SUMMARY OF THE INVENTION

Accordingly, it is a primary object of the present invention to provide an improved apparatus and method for liquid/solid separation by means of filtration and, more particularly, hyperbaric filtration.

Yet another object of the present invention is to provide a hyperbaric filtration apparatus and method that relies upon not only pressure differential but pulsation of fluid pressure differential, alone or in conjunction with the passage of an electric current through the filter cake. Such an apparatus and method is uniquely adjustable to optimize parameters to obtain the best results.

Yet another object of the present invention is to provide a uniquely efficient method of hyperbaric filtration wherein existing hyperbaric filtering assemblies may be modified by a relatively simple procedure whereby their efficiency of operation is increased.

Another object of the present invention is to provide an apparatus and method of hyperbaric filtration allowing more efficient filtering by reducing the overall power and compressed air consumption.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved apparatus and method are provided for hyperbaric filtration. The apparatus includes a sealable filtering vessel having or defining an internal filtering cavity. A porous filtering plate mounted in the filtering vessel divides the filtering cavity into first and second chambers. The first chamber is adapted to receive and hold the filter cake. A mechanism is also provided for delivering fluid at a positive pressure into the first chamber. Specifically, that mechanism includes a pressurized fluid source, a delivery conduit providing fluid communication between the pressurized fluid source and the fist chamber and a flow control valve in the delivery conduit.

Additionally, the apparatus includes a means for releasing fluid pressure from the second chamber in a pulsating manner. Advantageously, the pulsating release of fluid pressure serves to vibrate the porous filtering plate and filter cake. This vibration serves to create and maintain open capillaries in the filter cake thereby freeing moisture for removal. Additionally, the vibration functions to maintain the pores in the filtering plate more open than in static filtering systems so as to allow more efficient removal of the moisture from the filter cake with the pulsating flow of pressurized fluid being exhausted from the filtering cavity. More specifically, the fluid pressure releasing means includes an exhaust conduit in fluid communication with the second chamber, a rotary exhaust valve in this exhaust conduit and a motor for driving the rotary exhaust valve.

In accordance with a further aspect of the present invention, means may be provided for supplying an electric current to the filter cake in the filtering vessel during filtering. Advantageously, under certain conditions such an electric current has been found to increase the efficiency of the filtering and substantially lower the moisture content of the filter cake after processing. More specifically, the electric current supplying means includes a power supply, a means for transmitting electric current from the power supply to the filter cake and a means for insulating the electric current transmitting means and filter cake from the filtering vessel. The current transmitting means includes a permeable disc-shaped electrode for contacting the filter cake, an electrical contact in an opposing wall of the filtering vessel and a spring conductor extending between a face of the permeable disc-shaped electrode and the electrical contact. The insulating means may include a sleeve of insulating material lining the filtering vessel.

In accordance with yet another aspect of the present invention a method of hyperbaric filtration of a filter cake held by a porous filtering plate in a filtering vessel is provided. The method includes the steps of delivering fluid at a positive pressure to a first side of the filter cake and filtering plate in the filtering vessel and releasing in a pulsating manner fluid pressure from a second side of the filter cake and filtering plate in the filtering vessel. Advantageously, this pulsating release of pressure serves to propagate vibration of the filter cake and porous filtering plate thereby freeing moisture in the manner described above for removal from the filter cake with the pulsating flow of pressurized fluid being exhausted from the filtering vessel.

More specifically, the pressurized fluid may be provided to the filtering vessel at substantially any pressure although a pressure between substantially 40 and 100 psi is most commonly utilized with the pulsating release of pressurized fluid occurring at a frequency between substantially 0.1 and 335 cycles per second.

In accordance with yet another aspect of the present method, an electric current may be applied to the filter cake during filtering. The current applied has a current density between substantially 1 mA/cm$^2$ and 350 mA/cm$^2$ and a voltage range between substantially 0.1 v and 120 v.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a schematical cross-sectional view of the apparatus of the present invention for hyperbaric filtration of filter cake; and FIG. 2 is a graphical representation showing the pressure differential between the first and second chambers when the exhaust valve is opened and closed in a constant cyclical manner.

Reference will now be made in detail to the present preferred embodiment of the invention, an example of which is illustrated in the accompanying drawing.

DETAILED DESCRIPTION OF THE DRAWING

Reference is now made to FIG. 1 showing the apparatus 10 of the present invention for hyperbaric filtration of a filter cake C. As shown, the apparatus 10 includes a three piece sealable filtering vessel 12 comprising a lid 14, an intermediate cylindrical body portion 16 and an exhaust manifold or bottom portion 18. Clamps 20 engage cooperating projecting mounting flanges 22 on the lid 14 and one end of the intermediate body portion 16 so as to secure the lid and intermediate body portion together. Rubber O-ring 24 seals the connection.

Clamps 26 engage the cooperating projecting flanges 28 on the exhaust manifold 18 and opposite end of the intermediate body portion 16 so as to hold those two pieces of the filtering vessel 12 together. Rubber O-ring 30, interdisposed between the intermediate body portion 16 and exhaust manifold 18 seals this connection. When interconnected as shown the three piece filtering vessel 12 defines an internal filtering cavity F.

As further shown, a porous filtering plate 32 is mounted in the filtering vessel 12 between the end of the intermediate body portion 16 and a shoulder 34 formed in the exhaust manifold 18. As should be appreciated, the filtering plate 32 extends across the internal filtering cavity F dividing that cavity into a first, upstream or upper chamber 36 and a second, downstream or lower chamber 38. The filter cake C is held on the filtering plate 32 in the first chamber 36.

Pressurized fluid such as air is delivered to the first chamber 36 from a pressurized fluid source 40 by means of a delivery conduit 42 in fluid communication with the first chamber through port 44 in the lid 14. A flow control valve 46 in the delivery conduit 42 allows adjustment of the fluid pressure as desired. Usually a pressure between substantially 40 and 100 psi is utilized for industrial applications.

An electric current, either A.C. or D.C. current may be utilized in sine wave form, may also be supplied or applied to the filter cake C in the filtering vessel 12 during filtering. The electric current is supplied by means of a power supply 48, such as a transformer and/or a DC power source, connected by means of an insulated electrical conductor 50 to a conductive metal section 52 of the delivery conduit 42 held in the lid 14 of the filtering vessel 12. The metal lid 14 and coil spring electrical conductor 54 in the first chamber 36 provide a current supply pathway from the metal section 52 of conduit 42 to a permeable, disk-shaped electrode 56 in contact with the filter cake C. Such a permeable dished shaped electrode may, for example, be a thin plate of aluminum or copper including apertures allowing the passage of pressurized fluid. An amp meter 58 and volt meter 60 allow the monitoring of the amperage and voltage of the electric current supplied to the filter cake C.

Of course, it should be appreciated that proper insulation must be provided to insure the safe and proper application of the electrical current to the filter cake C. Toward this end, the inner wall of the intermediate body portion 16 defining the first chamber 36 is insulated by a continuous sleeve 62 of insulating material such as rubber. The metal section 52 of conduit 42 may be insulated by a rubber sleeve 64 with the remainder of the conduit being formed from nonconducting plastic. Additionally, an insulating gasket 66 may also be provided between the clamp 20 and cooperating flanges 22 of the lid 14 and intermediate body portion 16. Further, the filtering vessel 12 is connected to ground by means of the electrical conductor 68. Grounding may be either of positive or negative polarity. Often, results vary depending upon the polarity of the grounding selected.

As further shown in drawing FIG. 1, a means, generally designated by reference numeral 70, is provided for releasing fluid pressure from the second chamber 38 in a pulsating manner. That means includes an exhaust conduit 72 connected to a port 74 in the exhaust manifold 18 so as to be in fluid communication with the second chamber 38. A rotary exhaust valve 76 is mounted in the exhaust conduit 72. The rotary valve 76 is driven by a drive motor 78 connected to a power source 80 and speed control 82. By manipulating the speed control 82, the pressurized fluid may be released in a pulsating manner at a frequency between substantially 0.1 and 335 cycles per second.

The hyperbaric filtration apparatus 10 of the present invention is designed for batch or intermittent operation. Specifically, clamps 20 are released and the lid 14, spring 54 and electrode 56 are removed from the intermediate cylindrical body portion 16 of the filtering vessel 12. The material to be filtered is then deposited in the first chamber 36 on the filtering plate 32. The electrode 56 is then repositioned within the chamber 36 in contact with and overlying the filter cake C. The spring 54 is then positioned in the chamber 36 overlying the electrode 56. The lid 14 is then repositioned on the intermediate body portion 16 closing the filtering vessel 12. The clamps 20 are then repositioned over the gaskets 66 and cooperating flanges 22 to seal the lid 14 and intermediate portion 16 of the filtering vessel 12 by means of the O-ring 24. When properly clamped in position, the electrically conducting metal section 52 of the conduit 42 is in electrical contact with the spring 54 through the metal lid 14 as shown in the drawing FIG. 1.

Hyperbaric filtration may now be commenced. First, the pressurized fluid source 40 and flow control valve 46 are adjusted to provide the desired positive pressure of fluid between, for example, 40 and 100 psi. Next, the power supply 48 is adjusted to supply the desired current through the conductor 50, metal conduit section 52, lid 14, spring 54 and electrode 56 to the filter cake C. Operation of the power supply 48 may be monitored by the amp meter 58 and volt meter 60 and adjustment of the power supply is made to provide a current density between substantially 1 mA/cm$^2$ and 350 mA/cm$^2$ and a voltage range between substantially 0.1 v and 120 v.

In addition, operation of the drive motor 78 is initiated to rotate the rotary valve 76 in exhaust conduit 72. Through operation and adjustment of the speed control 82, the release of pressurized fluid may be made to pulsate at a frequency of between substantially 0.1 and 335 cycles per second.

It should, therefore, be appreciated that the present apparatus 10 allows a number of operating parameters, including the pressure of the pressurized fluid, the current density and voltage of the electrical supply and the frequency of the pulsation, to all be adjusted to provide the most efficient and effective filtering and moisture removal from the filter cake. For example, certain current densities and voltages will provide for better moisture removal depending upon the type of material forming the filter cake C.

Similarly, depending on the type and amount of filter cake C held on the filtering plate 32, the resonant frequency of the filter cake C and plate 32 will vary. Some change in the resonant frequency will also occur during filtering as a result of change in moisture/content. Ideally, the speed control 82 is adjusted to provide the necessary pulsation to the release of fluid pressure to match the resonant frequency thereby maximizing propagation of the vibratory effect. The greater the vibratory effect to the filter cake C and filtering plate 32, the greater the formation and maintaining of capillaries in the filter cake C for freeing moisture for removal with the pulsating flow of pressurized fluid from the filtering vessel 12. Further, the greater the vibratory effect, the greater the probability of maintaining the pores of the filtering plate 32 open for the more efficient passage of pressurized fluid with entrained moisture from the filter cake C.

Accordingly, by adjusting the various parameters of operation, it should be appreciated that the filtering effect may be maximized and, advantageously, overall power and compressed air consumption are reduced. Additionally, processing time is reduced. Therefore, overall productivity (eg. filter throughput) is increased. In fact, the present apparatus without the application of the electrical current exhibits a filtering efficiency at least 20 to 50% greater than static systems known in the art. In certain situations with the application of electrical current that increase in efficiency may be has high as 200–300%.

The pulsation effect may best be understood with the reference to FIG. 2. In this figure, the drive motor 78 and hence the rotary valve 76 rotate at a constant speed to provide a constant frequency of pulsation. Due to the delivery of pressurized fluid from the pressurized fluid source 40 directly into the first chamber 36 through the port 44, the pressure in the first chamber 36 is maintained substantially constant throughout the filtering operation (note upper line U). In contrast, the pressure in the second chamber 38 fluctuates rising when the rotary valve 76 is closed and dropping when the rotary valve is opened as shown by the sawtooth line S.

The amplitude of the changing pressure in the second chamber 38 is dependent upon the resistance of the filter cake C and porous filter plate 32 to the flow of pressurized fluid from the first chamber 36. With each opening and closing of the rotary valve 76, however, the sudden change in the fluid pressure in the second chamber 38 creates a pulsation that breaks the bonds between the particles and moisture in the filter cake and also propagates vibration in the filtering plate 32 and filter cake C that further frees moisture for removal.

Of course, it should be appreciated that the volume of the second chamber 38 affects the amplitude of the pulsation. More specifically, assuming a constant diffusion rate of pressurized fluid from the first chamber 36 through the filter cake C and filtering plate 32, the smaller the volume of the second chamber 38, the more rapid the rise in pressure in that chamber. Hence, by making the volume of the second chamber 38 smaller, the amplitude of pulsation may be increased. Accordingly, it should be appreciated that exhaust manifolds 18 defining various volumes for the second chamber 38 may be utilized in constructing the filtering vessel 12. Alternatively, a filler material may be positioned in the second chamber 38 to reduce the effective volume thereof. In this way pulsation amplitude adjustment is possible.

In summary, numerous benefits have been described which result from employing concepts of the present invention. Advantageously, the present apparatus and method relate to a simple and efficient means of hyperbaric filtration that may be employed for more efficiently and effectively removing moisture from a filter cake. A particular benefit is the ability to control the positive fluid pressure, the voltage and current density of the electrical supply and the frequency and amplitude of pulsation of the fluid pressure as it is exhausted from the filtering chamber so as to provide the desired vibratory effect to the filter cake and filtering plate to free moisture for removal.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the filtering plate and filter cake may be vibrated by mechanical means. Additionally, positive fluid pressure may also be provided to the second chamber 38 when the exhaust valve 76 is closed. This serves to increase the pressure drop when the valve 76 is subsequently opened thereby increasing the amplitude of pulsation as the valve is cycled.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

I claim:

1. An apparatus for hyperbaric filtration of a filter cake, comprising:

a sealable filtering vessel including an internal filtering cavity;

a porous filtering plate mounted in said filtering vessel and dividing said filtering cavity into first and second chambers, said first chamber holding the filter cake;

means for delivering fluid at a positive pressure into said first chamber; and means for releasing said fluid pressure from said second chamber in a pulsating manner such that said porous filter plate and filter cake are vibrated thereby freeing moisture for removal from the filter cake with the pulsating flow of pressurized fluid through said filtering cavity.

2. The apparatus set forth in claim 1, wherein said fluid delivering means includes a pressurized fluid source, a delivery conduit and a flow control valve in said delivery conduit.

3. The apparatus set forth in claim 2, wherein said fluid pressure releasing means includes an exhaust conduit, a rotary exhaust valve in said exhaust conduit and a motor for driving said rotary exhaust valve.

4. The apparatus set forth in claim 3, further including means for supplying an electric current to the filter cake in said filtering vessel during filtering.

5. The apparatus set forth in claim 4, wherein said electric current supplying means includes a power supply means, means for transmitting electric current from said power supply means to the filter cake and means for insulating the electric current transmitting means and filter cake from said filtering vessel.

6. The apparatus set forth in claim 5, wherein said electric current transmitting means includes an electrical contact mounted to said filtering vessel, a permeable disc-shaped electrode for contacting the filter cake and a spring conductor extending between a face of said permeable disc-shaped electrode and said electrical contact.

7. The apparatus set forth in claim 6, wherein said insulating means includes a sleeve of insulating material lining said filtering vessel.

8. The apparatus set forth in claim 1, wherein said fluid pressure releasing means includes an exhaust conduit, a rotary exhaust valve in said exhaust conduit and a motor for driving said rotary exhaust valve.

9. The apparatus set forth in claim 8, further including means for supplying an electric current to the filter cake in said filtering vessel during filtering.

10. The apparatus set forth in claim 9, wherein said electric current supplying means includes a power supply means, means for transmitting electric current from said power supply means to the filter cake and means for insulating the electric current transmitting means and filter cake from said filtering vessel.

11. The apparatus set forth in claim 10, wherein said electric current transmitting means includes an electrical contact mounted to said filtering vessel, a permeable disc-shaped electrode for contacting the filter cake and a spring conductor extending between a face of said permeable disc-shaped electrode and said electrical contact.

12. The apparatus set forth in claim 11, wherein said insulating means includes a sleeve of insulating material lining said filtering vessel.

13. The apparatus set forth in claim 1, further including means for supplying an electric current to the filter cake in said filtering vessel during filtering.

14. The apparatus set forth in claim 13, wherein said electric current supplying means includes a power supply means, means for transmitting electric current from said power supply means to the filter cake and means for insulating the electric current transmitting means and filter cake from said filtering vessel.

15. The apparatus set forth in claim 14, wherein said electric current transmitting means includes an electrical contact mounted to said filtering vessel, a permeable disc-shaped electrode for contacting the filter cake and a spring conductor extending between a face of said permeable disc-shaped electrode and said electrical contact.

16. The apparatus set forth in claim 15, wherein said insulating means includes a sleeve of insulating material lining said filtering vessel.

17. A method of hyperbaric filtration of a filter cake held on a porous filtering plate in a filtering vessel, comprising the steps of:

delivering fluid at a positive pressure to a first, upstream side of the filter cake and porous filtering plate in the filtering vessel; and releasing in a pulsating manner said fluid pressure from a second, downstream side of the filter cake and porous filtering plate in the filtering vessel such that the filter cake and porous filtering plate are vibrated thereby freeing moisture for removal from the filter cake with the pulsating flow of pressurized fluid from the filtering vessel.

18. The method set forth in claim 17, wherein said pressurized fluid is provided at a pressure between substantially 40 and 100 psi and said pulsating release of pressurized fluid occurs at a frequency between substantially 0.1 and 335 cycles/second.

19. The method set forth in claim 17, further including applying an electric current to the filter cake during filtering.

20. The method set forth in claim 19, wherein said current applied has a current density between substantially 1 mA/cm$^2$ and 350 mA/cm$^2$ and a voltage range between substantially 0.1 v and 120 v.

* * * * *